(12) United States Patent
Bungard

(10) Patent No.: US 11,788,345 B2
(45) Date of Patent: Oct. 17, 2023

(54) ANIMAL KENNEL DOOR SYSTEM

(71) Applicant: Damon Bungard, Spencer, TN (US)

(72) Inventor: Damon Bungard, Spencer, TN (US)

( * ) Notice: Subject to any disclaimer, the term of this patent is extended or adjusted under 35 U.S.C. 154(b) by 0 days.

(21) Appl. No.: 17/459,607

(22) Filed: Aug. 27, 2021

(65) Prior Publication Data

US 2022/0065031 A1 Mar. 3, 2022

Related U.S. Application Data

(60) Provisional application No. 63/071,844, filed on Aug. 28, 2020.

(51) Int. Cl.
| | | |
|---|---|---|
| *A01K 1/00* | (2006.01) | |
| *E06B 7/32* | (2006.01) | |
| *A01K 1/03* | (2006.01) | |

(52) U.S. Cl.
CPC ............. *E06B 7/32* (2013.01); *A01K 1/0017* (2013.01); *A01K 1/033* (2013.01)

(58) Field of Classification Search
CPC .......... A01K 1/0017; A01K 1/03; E06B 5/00; E06B 7/32
See application file for complete search history.

(56) References Cited

U.S. PATENT DOCUMENTS

| | | | | |
|---|---|---|---|---|
| 3,698,360 A | * | 10/1972 | Rubricius | ................. A01K 1/02 119/17 |
| 4,590,885 A | * | 5/1986 | Sugiura | .................. A01K 31/08 119/19 |
| 6,571,740 B1 | | 6/2003 | Kinder et al. | |
| 7,228,820 B1 | * | 6/2007 | Kellogg | .................... A01K 1/03 119/498 |
| 8,186,306 B2 | * | 5/2012 | Hampel | .................... A01K 1/00 119/514 |
| 2008/0245313 A1 | * | 10/2008 | Jakubowski | ............. A01K 1/03 119/497 |
| 2010/0282179 A1 | * | 11/2010 | Ho | ........................... A01K 1/03 119/455 |
| 2014/0230740 A1 | * | 8/2014 | Mihlbauer | ............... A01K 1/03 119/246 |
| 2014/0352626 A1 | * | 12/2014 | Kellogg | .................... A01K 1/03 |
| 2016/0095289 A1 | * | 4/2016 | Hampel | .................... A01K 1/00 |
| 2020/0037574 A1 | | 2/2020 | Bungard | |

* cited by examiner

*Primary Examiner* — Joshua J Michener
*Assistant Examiner* — Henry Hooper Mudd
(74) *Attorney, Agent, or Firm* — Meunier Carlin & Curfman LLC

(57) ABSTRACT

Various implementations include an animal kennel door system. The system includes a door frame and a door. The door frame includes a frame body and one or more connecting flanges. The frame body defines a frame opening, and each of the one or more connecting flanges extends from the frame body away from the frame opening. The one or more connecting flanges has at least one coupling surface. The coupling surface has at least a first coupling portion and a second coupling portion. The door is hingedly coupled to a portion of the frame body. A portion of the first and second flange coupling portions each lie in a different plane, and the planes are transverse to each other.

9 Claims, 7 Drawing Sheets

ANIMAL KENNEL DOOR SYSTEM

CROSS-REFERENCE TO RELATED APPLICATIONS

This application claims priority to and the benefit of U.S. Provisional Patent Application No. 63/071,844, filed Aug. 28, 2020, and entitled "ANIMAL KENNEL DOOR SYSTEM," the entire contents of which is hereby incorporated by reference herein.

BACKGROUND

Animal kennels are enclosures designed to confine an animal and allow the animal to enter and exit as an owner or caretaker specifies. Some current portable animal kennels utilize rotomolding technology to form the enclosure.

Two-layer rotomolded designs have been used for portable animal kennel systems to provide an impact resistant body and sufficient rigidity during potential transportation impacts. However, the rigidity of the two-layer rotomolded animal kennels can cause damage to an animal inside the kennel if the animal collides with the walls of the kennel. The rigid two-layer body can also cause damage to the kennel's surroundings, such as a car or passenger.

Single-layer rotomolded animal kennels are less harsh to animals and surroundings upon impact. However, single-layer rotomolded animal kennels tend to lack rigidity, which also poses a safety risk to an animal inside the kennel during impact.

Thus, there exists a need for an animal kennel that has sufficient rigidity to protect an animal inside the animal kennel, while retaining the flexibility required not to damage the animal and the animal kennel's surroundings upon impact.

SUMMARY

Various implementations include an animal kennel door system. The system includes a door frame and a door. The door frame includes a frame body and one or more connecting flanges. The frame body defines a frame opening, and each of the one or more connecting flanges extends from the frame body away from the frame opening. The one or more connecting flanges has at least a first flange coupling portion and a second flange coupling portion. The door is hingedly coupled to a portion of the frame body. The first and second flange coupling portions each define a plane, and the plane of the first flange coupling portion is transverse to the plane of the second flange coupling portion.

In some implementations, the door frame is made of metal. In some implementations, the door frame comprises aluminum. In some implementations, the door frame is at least partially over-molded with a plastic material.

In some implementations, the door comprises metal. In some implementations, the door comprises aluminum. In some implementations, the door is at least partially over-molded with a plastic material.

In some implementations, the door frame is symmetrical about at least one axis.

In some implementations, at least one of the connecting flanges defines one or more fastener openings.

In some implementations, the door is hingedly coupled to the portion of the door frame by a piano hinge. In some implementations, the piano hinge includes a removable pin.

In some implementations, the plane of the first flange coupling portion and the plane of the second flange coupling portion define an angle with respect to the each other. The angle is between 0 and 180 degrees. For example, in one implementation, the angle is 120 degrees.

Various other implementations include an animal kennel system. The animal kennel system includes an animal kennel door system and a kennel. The animal kennel door system includes a door frame and a door. The door frame includes a frame body and one or more connecting flanges. The frame body defines a frame opening, and each of the one or more connecting flanges extends from the frame body away from the frame opening. The one or more connecting flanges has at least a first flange coupling portion and a second flange coupling portion. The door is hingedly coupled to a portion of the frame body. The first and second flange coupling portions each define a plane, and the plane of the first flange coupling portion is transverse to the plane of the second flange coupling portion.

The kennel includes a hollow body, having an inner surface and an outer surface. The body defines a kennel opening extending from the outer surface to the inner surface. The kennel includes at least one protrusion extending from the outer surface of the body adjacent the kennel opening. The at least one protrusion has at least two protrusion portions. At least two of the flange coupling portions are couplable to at least one of the protrusion portions such that each of the at least two of the flange coupling portions abuts at least one of the protrusion portions.

In some implementations of the animal kennel system, the door frame comprises metal. In some implementations of the animal kennel system, the door frame comprises aluminum. In some implementations of the animal kennel system, the door frame is at least partially over-molded with a plastic material.

In some implementations of the animal kennel system, the door comprises metal. In some implementations of the animal kennel system, the door comprises aluminum. In some implementations of the animal kennel system, the door is at least partially over-molded with a plastic material.

In some implementations of the animal kennel system, the door frame is symmetrical about at least one axis.

In some implementations of the animal kennel system, each of the at least one connecting flanges defines one or more fastener openings.

In some implementations of the animal kennel system, the door is hingedly coupled to the portion of the doorframe by a piano hinge. In some implementations of the animal kennel system, the piano hinge includes a removable pin.

In some implementations of the animal kennel system, the plane of the first flange coupling portion and the plane of the second flange coupling portion define an angle with respect to the each other. The angle is between 0 and 180 degrees. For example, in one implementation, the angle is 120 degrees.

In some implementations of the animal kennel system, the shape of the kennel opening is square.

In some implementations of the animal kennel system, the hollow body is made of rotomolded plastic. In some implementations of the animal kennel system, the hollow body is made of a single layer of rotomolded plastic.

In some implementations of the animal kennel system, the kennel further comprises at least one handle coupled to the outer surface of the hollow body.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein include an animal kennel system having an animal kennel and an animal kennel door system, which can be used to secure an animal inside the animal kennel system for safe transportation. The animal kennel door system includes a door and a rigid frame body. A plurality of flanges extend from frame body and are shaped and angled to abut protrusions on the animal kennel and couple the frame body to the animal kennel. The protrusions are disposed about an opening defined by the body of the animal kennel, and this opening weakens the overall rigidity of the animal kennel such that the other sides of the animal kennel are subject to deformation in response to a force applied to any side of the animal kennel. However, when the flanges are coupled to the protrusions, the rigidity of the animal kennel door system reinforces the structural rigidity of the animal kennel while allowing the animal kennel to be light weight and safe for an animal occupant.

Various implementations include an animal kennel door system. The system includes a door frame and a door. The door frame includes a frame body and one or more connecting flanges. The frame body defines a frame opening, and each of the one or more connecting flanges extends from the frame body away from the frame opening. The one or more connecting flanges has at least one coupling surface. The coupling surface has at least a first coupling portion and a second coupling portion. The door is hingedly coupled to a portion of the frame body. A portion of the first and second flange coupling portions each lie in a different plane, and the planes are transverse to each other.

Various other implementations include an animal kennel system. The system includes an animal kennel door system, such as the animal door system described above, and a kennel. The kennel includes a hollow body, having an inner surface and an outer surface. The inner surface defines an inner cavity. The body defines a kennel opening extending from the outer surface to the inner surface and is in communication with the inner cavity. The kennel includes at least one protrusion extending from the outer surface of the body adjacent the kennel opening. The at least one protrusion has at least one protrusion surface. The at least one protrusion surface has at least two protrusion portions that lie in different planes from each other. The coupling portions of the flange coupling surface are couplable to the protrusion portions of the protrusion surfaces.

Figure 1:
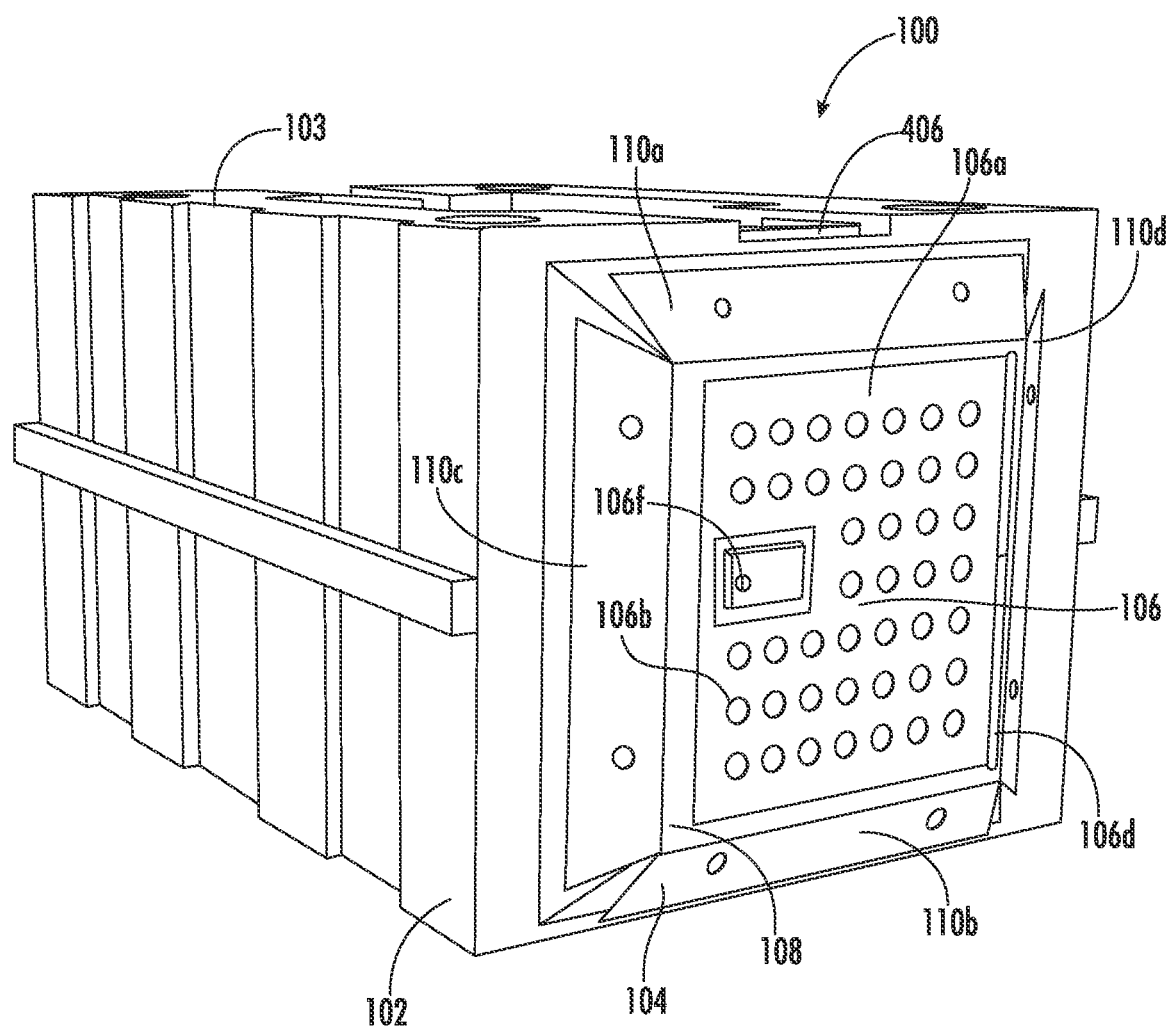
FIG. 1 is a perspective view of an animal kennel system having an animal kennel door system.
Figure 2A:
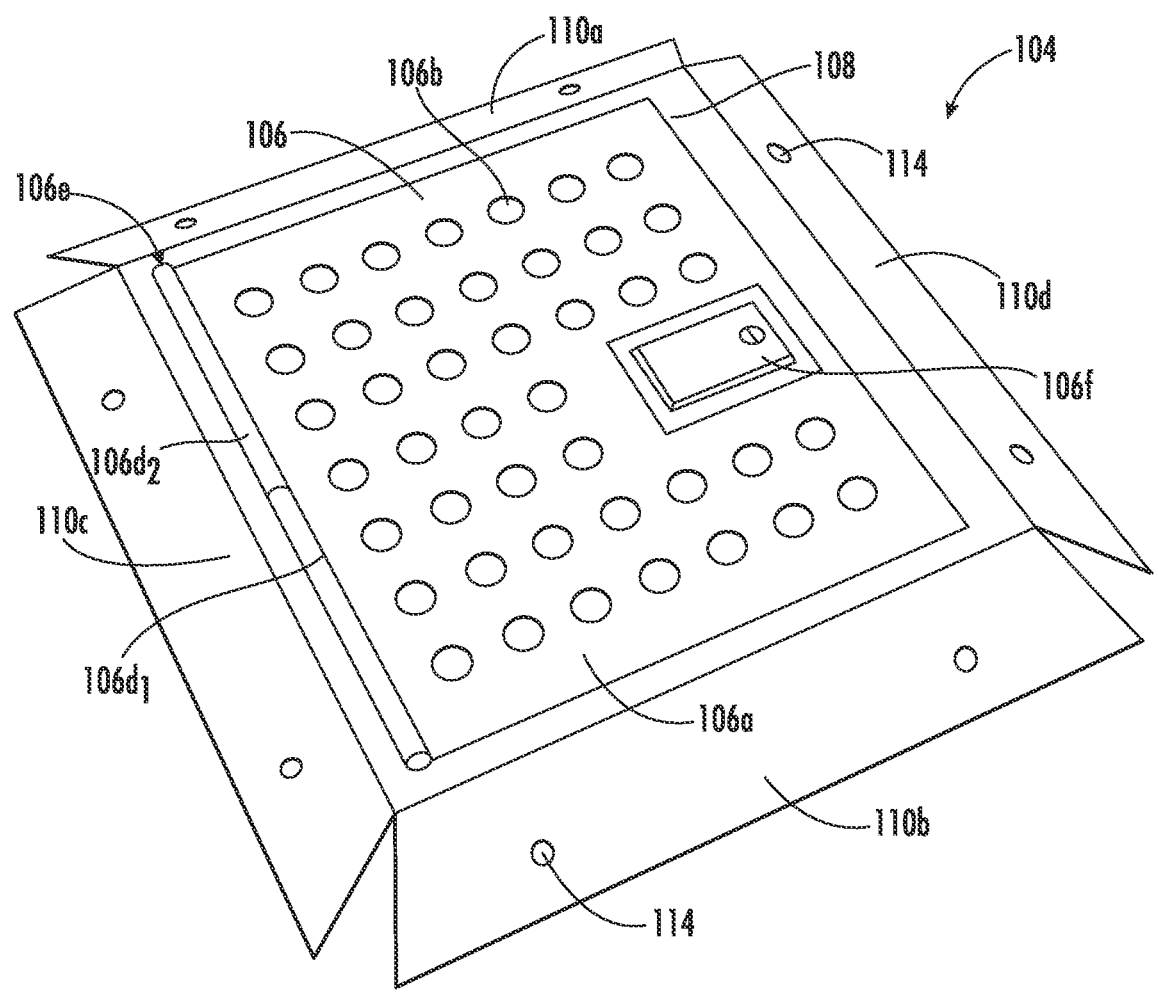
FIG. 2A is a perspective view of the animal kennel door system, of FIG. 1.
Figure 2B:
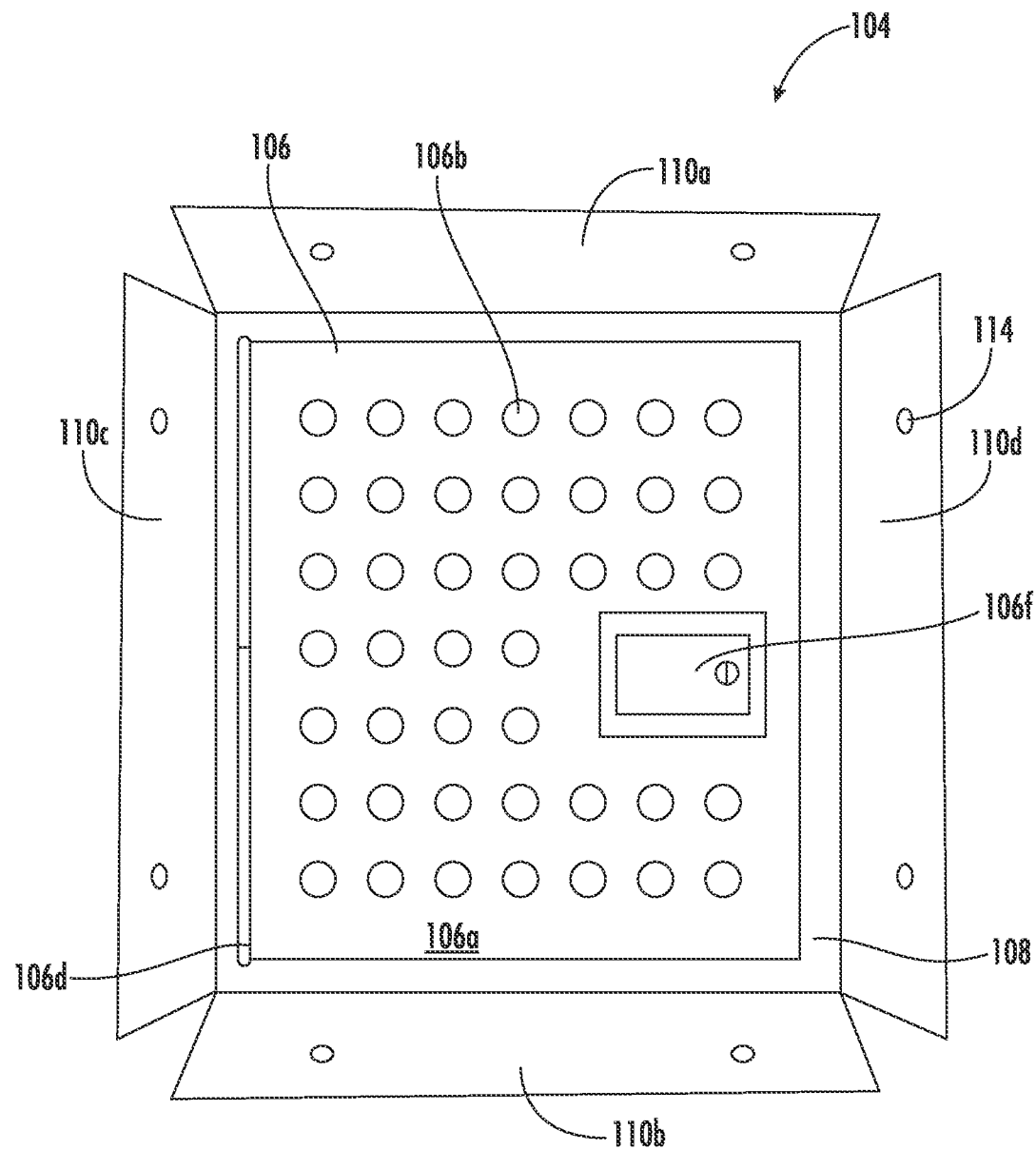
FIG. 2B is a front view of the animal kennel door system of FIG. 1.
Figure 2C:
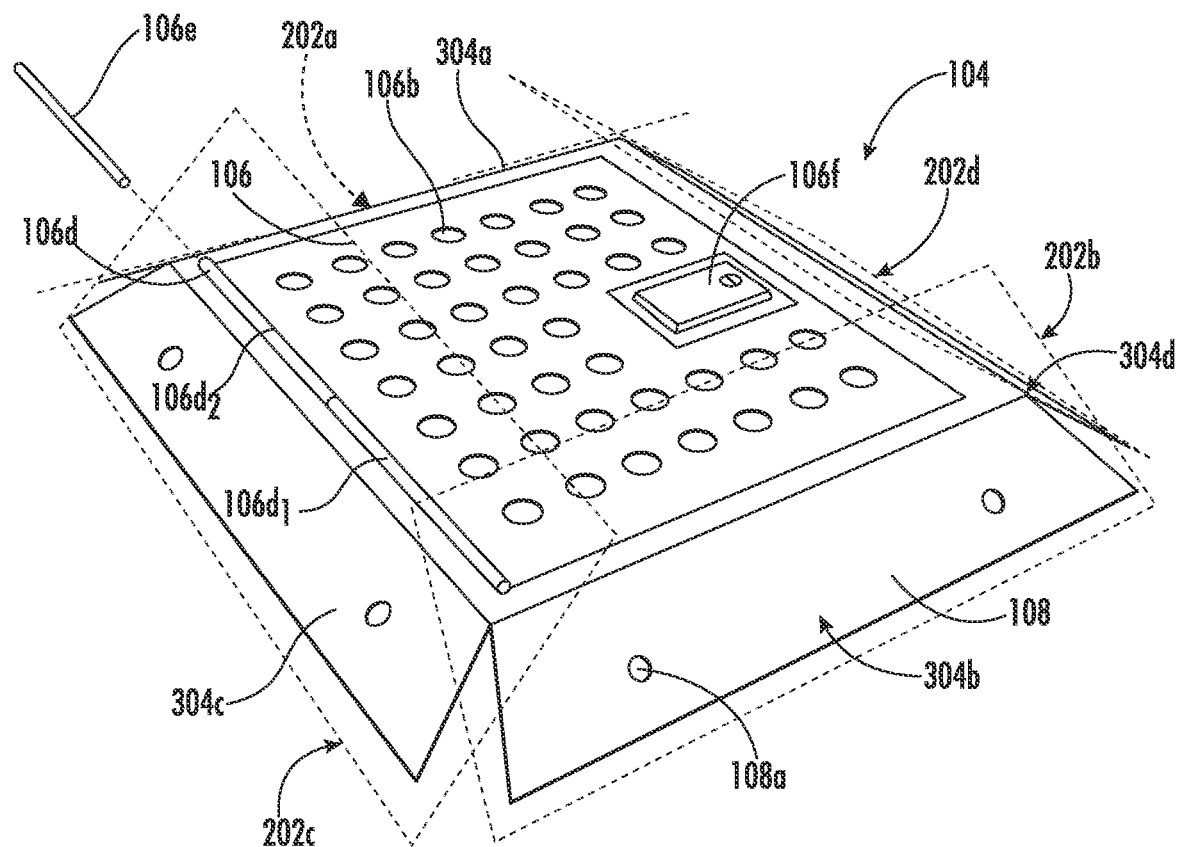
FIG. 2C is a perspective view of the animal kennel door system of FIG. 1.
Figure 3:
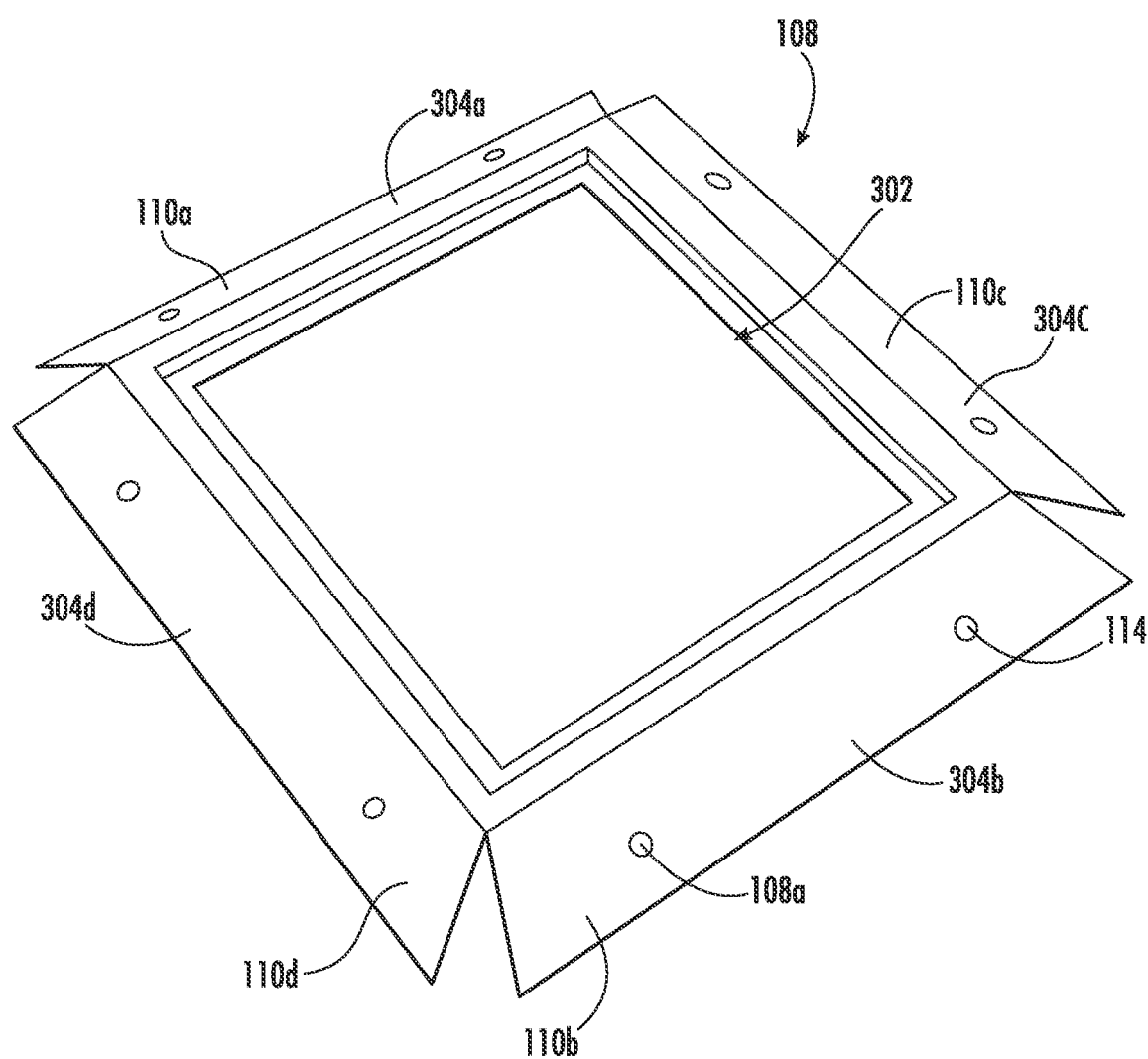
FIG. 3 is a perspective rear view of the door frame of the animal kennel door system of FIG. 1.
Figure 4:
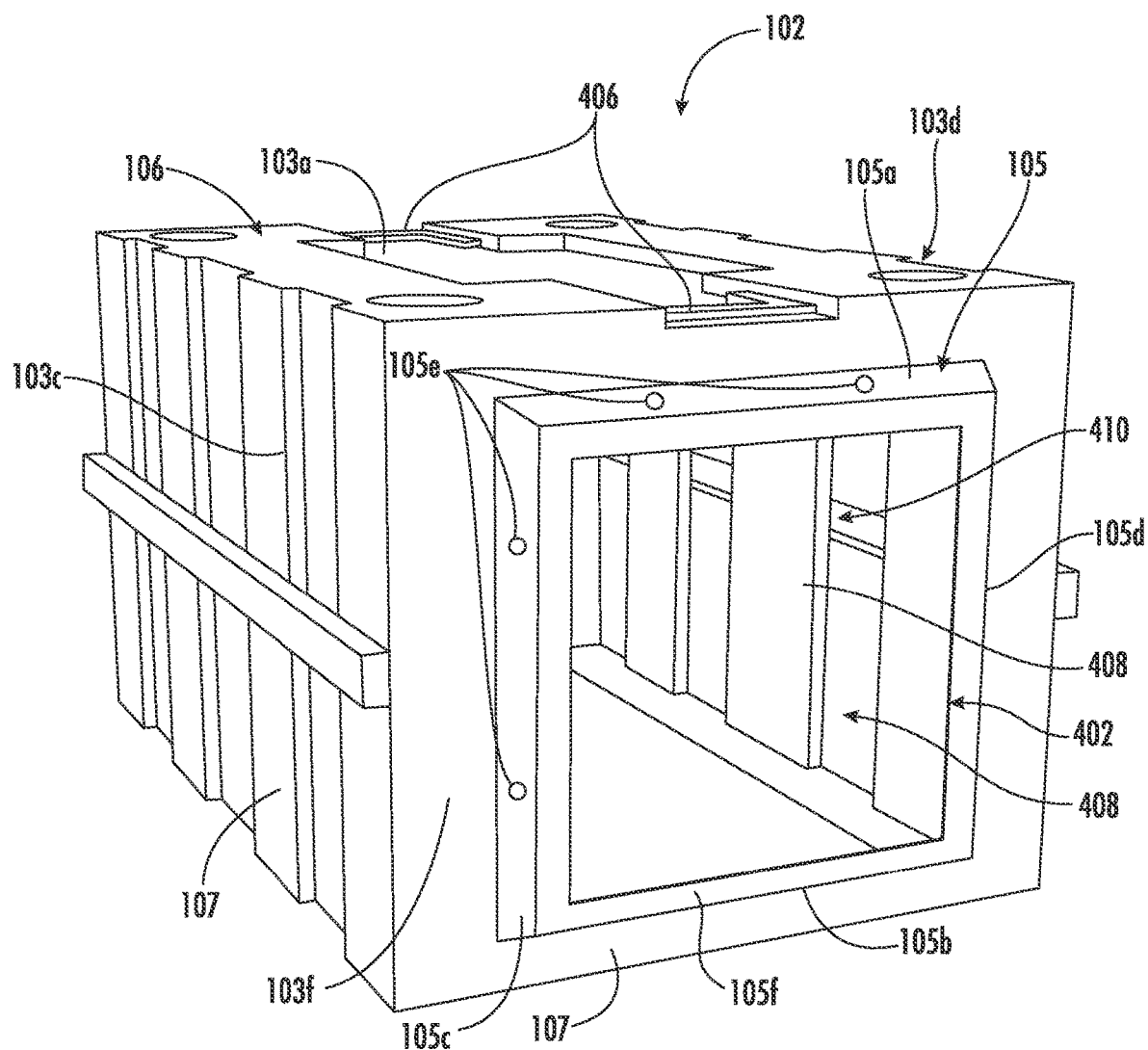
FIG. 4 is a top perspective view of the animal kennel of FIG. 1, without the animal kennel door system.
Figure 5:
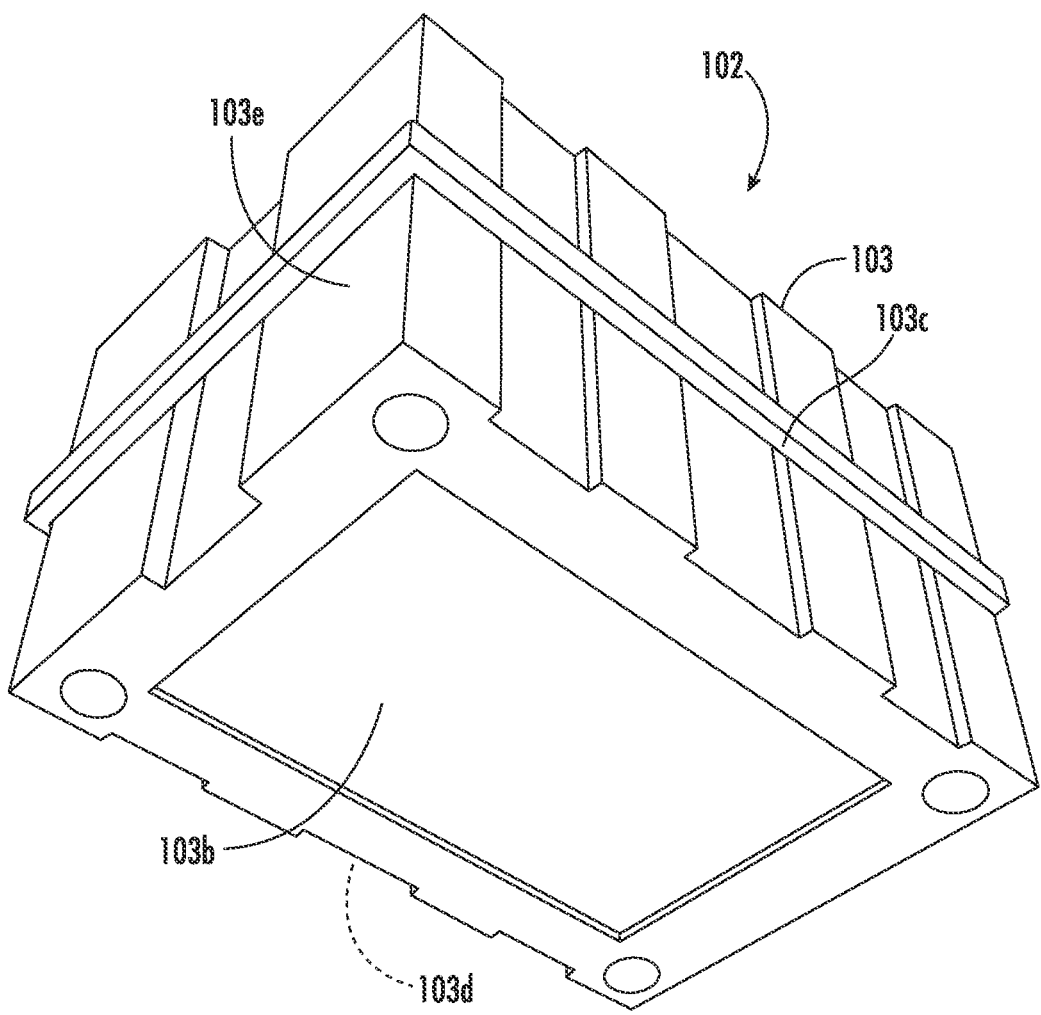
FIG. 5 is a bottom perspective view of the animal kennel system of FIG. 1.

FIGS. 1-5 show an animal kennel system 100 according to one implementation. The animal kennel system 100 includes an animal kennel 102 and an animal kennel door system 104. FIGS. 1 and 4-5 show the animal kennel 102, and FIGS. 2A-3 show the animal kennel door system 104.

According to some implementations, the animal kennel 102 is lightweight and portable, and the animal kennel door system 104 reinforces the structural rigidity of the animal kennel 102 to protect an animal inside the animal kennel 102.

Referring to FIGS. 1 and 4-5, the animal kennel 102 is a single layer, rotomolded, hollow body 103 enclosure that has six walls 103a-f. Walls 103a-103e are enclosed, and the wall 103f defines an opening 402. The opening 402 allows for entry and exit of an animal into the inner cavity 410 of the animal kennel 102. The walls 103a-103f of the body 103 of the animal kennel 102 have an outer surface 107 and an inner surface 408. The inner surfaces 408 of the walls 103a-103f define an inner cavity 410, and the inner cavity 410 is in communication with the opening 402.

As shown in FIG. 4, a protrusion 105 extends outwardly from the outer surface 107 of the wall 103f of the body 103. The protrusion 105 is adjacent the opening 402 and extends around the perimeter of the opening 402. The protrusion 105 shown in FIGS. 1 and 4-5 has a frusto-pyramidal shape. The protrusion 105 has a first protrusion portion 105a, a second protrusion portion 105b, a third protrusion portion 105c, a fourth protrusion portion 105d, and a fifth protrusion portion 105f. The first protrusion portion 105a and the second protrusion portion 105b each extend between the third 105c and fourth protrusion portions 105d. The protrusion portion 105f lies in a plane that is parallel to the plane that includes the outer surface 107 of the sixth wall 103f of the body 103. The protrusion portions 105a-105d extend between the protrusion portion 105f and the outer surface 107 of the sixth wall 103f of the body 103, and the planes in which the protrusion portions 105a-105d lie are transverse to the planes that include the protrusion portion 105f and the outer surface 107 of the sixth wall 103f of the body 103. As shown in FIGS. 1, 4, and 5, the first protrusion portion 105a is disposed at a 120 degree angle with respect to the second protrusion portion 105b, and the third protrusion portion 105c is disposed at a 120 degree angle with respect to the fourth protrusion portion 105d. But, in some implementations the first protrusion portion is disposed at any angle less than 180 degrees and greater than 0 degrees with respect to the second protrusion portion, and the third protrusion portion is disposed at any angle less than 180 degrees and greater than 0 degrees with respect to the fourth protrusion portion. Each of the protrusion portions 105a-d defines fastener openings 105e.

The body 103 of the animal kennel 102 shown in FIGS. 1 and 4-5 is a single-layer rotomolded hollow body, but in some implementations, the body of the animal kennel is a multi-layer rotomolded hollow body having two or more rotomolded layers. The rotomolded body is made from polyethylene or any other suitable polymer material (e.g., polypropylene, polyamides, vinyls (e.g., polyvinyl chloride), polycarbonate) for providing a sufficiently rigid kennel structure.

The animal kennel 102 shown in FIGS. 1 and 4 has two handles 406 coupled to the body 103 of the animal kennel 102. Each handle 406 is a C-shaped handle and is rotatably coupled to the body 103 adjacent ends of the handle 406. The handles 406 are rigid and are made from a plastic and/or metal material. In other implementations, the animal kennel includes at least one handle disposed about at least one outer surface of the animal kennel. For example, the animal kennel may have a flexible handle that wraps around a portion of the outer surface of the animal kennel such that the handle forms a loop. In addition, in other implementations, the one or more handles may be integrally formed with the body 103 or the one or more handles may be separately formed from the body 103 and coupled to the body with a flexible material (e.g., rope).

Referring to FIGS. 1-3, the animal kennel door system 104 includes a door 106 and a door frame body 108. The frame body 108 corresponds to the shape of the door 106, and a frame opening 302 defined by the door frame 108 outlines a shape of the door 106. The door 106 forms a barrier at the frame opening 302 when in the closed position.

The door 106 has a first surface 106a configured to face the outside of the animal kennel 102 when the animal kennel door system 104 is coupled to the animal kennel 102, and a second surface (not shown) that is opposite and spaced apart from the first surface 106a and faces the inner cavity 410 of the animal kennel 102 when the door 106 is in the closed position. The door 106 also defines a plurality of openings 106b extending from the first surface 106a of the door 106 to the second surface of the door 106. The openings 106b extend through the door 106 and allow air to pass from outside of the animal kennel 106 to the inner cavity 410 of the animal kennel 102. The openings 106b defined by the door 106 provide for sufficient oxygen flow to an animal within the inner cavity 410 of the animal kennel 102. The openings 106b are configured such that the door 106 also provides enough rigidity to create a secure barrier for an animal within the inner cavity 410 of the animal kennel 102.

The openings 106b in the door 106 shown in FIGS. 1-2C are circular, but in other implementations, the holes are square, rectangular, or any other suitable shape for allowing air to pass from outside of an animal kennel to an inner cavity of the animal kennel.

The door 106 also has a handle 106f, as shown in FIGS. 1-2C. The handle 106f is disposed on the first surface 106a of the door 106. The handle 106f is also partially embedded in the door 106 about a side of the door opposite a hinge 106d. The handle 106f provides a lever for a user to rotate the door 106 with respect to the frame body 108. In the animal kennel door system 104, the handle 106f is a lockable hinge handle. But, in other implementations, the handle is a fixed protrusion, a knob, or any other suitable type of handle, which provides a user with a lever to rotate the door with respect to the frame body.

The animal kennel door system 104 also includes a first connecting flange 110a, a second connecting flange 110b, a third connecting flange 110c, and a fourth connecting flange 110d that extend from the perimeter of the frame body 108 in a direction away from the frame opening 302. In the implementation shown in FIGS. 1-3, the flanges 110a-11d and the frame body 108 are integrally formed.

The connecting flanges 110a-d in FIGS. 1-3 are each a trapezoidal shape as viewed from a plan view of each flange 110a-d, but in other implementations, the connecting flanges are rectangular, semicircular, triangular, or any other suitable shape that can abut, and be secured to, a protrusion portion of a protrusion of an animal kennel.

FIG. 3 shows a side of the door frame 108 that faces the animal kennel 102 when coupled thereto. The first connecting flange 110a has a first flange coupling surface 304a, the second connecting flange 110b has a second flange coupling surface 304b, the third connecting flange 110c has a third flange coupling surface 304c, and the fourth connecting flange 110d has a fourth flange coupling surface 304d. Each of the flange coupling surfaces 304a-d are planar surfaces of the connecting flanges 110a-d and are configured to abut and be coupled to one of the angled outer surfaces of the protrusion portions 105a-105d of the animal kennel 102.

As shown in FIG. 2C, the first flange coupling surface 304a defines a first plane 202a, the second flange coupling surface 304b defines a second plane 202b, the third flange coupling surface 304c defines a third plane 202c, and the fourth flange coupling surface 304d defines a fourth plane 202d. The first plane 202a of the first flange coupling surface 304a is disposed at a 120 degree angle with respect to the second plane 202b of the second flange coupling surface 304b, and the third plane 304c of the third flange coupling surface 202c is disposed at a 120 degree angle with respect to the fourth plane 202d of the fourth flange coupling surface 304d. The planes 202a-202d intersect a plane that includes the frame body 108 at angles that correspond to the respective planes of the protrusion portions 105a-105d to which the coupling surfaces 304a-304d of the flanges 110a-110d are to be coupled.

The first protrusion portion 105a is coupled to the first flange coupling portion 304a of the first connecting flange 110a, and the second protrusion portion 105b is connected to the second flange coupling portion 304b of the second connecting flange 110b. The third protrusion portion 105c is coupled to the third flange coupling portion 304c of the third connecting flange 110c, and the fourth protrusion portion 105d is coupled to the fourth flange coupling portion 304d of the fourth connecting flange 110d. Each of the flanges 110a-d include fastener openings 114 that align with respective fastener openings 105e defined the protrusion portions 105a-d, and the fastener openings 114, 105e are shaped to receive bolts. The animal kennel door system 104 shown in FIG. 1 is coupled to the animal kennel 102 with bolts (not shown) extending through each of the aligned fastener openings 114, 105e. The coupling surfaces 304a-304d abut and lie flat against the respective protrusion portions 105a-105d. And, in some implementations, the surface of the frame body 108 that faces the protrusion portion 105f abuts the surface of the protrusion portion 105f.

Although FIGS. 1-3 show connecting flanges 110a-d having openings 114 shaped to receive bolts, the flanges 110a-d can also receive various fasteners such as rivets, screws, or any other fastener capable of coupling a flange to an abutting outer surface of a protrusion of an animal kennel. In other implementations, the flanges have no openings and are coupled to an animal kennel by welding, adhesive, or any other suitable method of securely coupling a flange to an abutting surface.

The door 106 and the frame body 108 are made from over-molding a metal base material (e.g., aluminum, stainless steel, titanium, or other suitable metal material) with polyethylene or another suitable polymer material (e.g., polypropylene, polyamides, vinyls (e.g., polyvinyl chloride), polycarbonate, glass filled nylon). The over-molded door 106 and frame body 108 retain the rigidity of the base material while providing additional resistance to impact and deformation. In other implementations, the base material and/or the over-molding material may include one or more metal and/or plastic materials. And, in other implementations, the base material may be at least partially over-molded or fully encapsulated. In some implementations, the door, the door frame, or both are not over-molded.

The door 106 shown in FIGS. 1-2C is coupled to the frame body 108 by a piano hinge 106d. The door 106 and the frame body 108 each have corresponding piano hinge leaves 106d1 and 106d2 attached rigidly to the door 106 and the frame body 108, respectively. The leaves of the hinge 106d are connected to each other by at least one pin 106e. The pin 106e (shown removed from the hinge 106d in FIG. 2C) is disposed within openings in both leaves of the hinge 106d and couples the door 106 to the frame body 108. The door 106 is rotatable about the pin 106e relative to the frame body 108. The piano hinge pin 106e shown in FIGS. 1-2C is removable. But in other implementations, the piano hinge pin is permanently disposed within the leaves of the hinge.

The door 106 shown in FIGS. 1-2C can be removed from the frame body 108 by removing the pin and detaching the door 106 from the frame body 108, but in other implementations, the door is permanently coupled to the frame body. Although the door is coupled to the animal kennel with a piano hinge in FIGS. 1-2C, in other implementations, the door is coupled to the animal kennel with a gate hinge, a strap hinge, or any other suitable hinge that allows for rotation of the door with respect to the frame body.

In some implementations, the frame body 108 is symmetrical about two axes such that the door 108 can be uncoupled from the animal kennel, rotated 90 degrees or 180 degrees relative to the animal kennel, and recoupled to the animal kennel. For example, as shown in FIGS. 1-3, the door frame 108, the frame opening 302, and the door 106 are square. However, in other implementations, the frame body, frame opening, and door may be rectangular shaped, elliptical shaped, circular shaped, or any suitable shape for providing an opening for an animal to enter and exit the animal kennel and to provide rigid support for the animal kennel when coupled thereto.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An animal kennel system, the system comprising:
an animal kennel door system, the system comprising:
a door frame including a frame body and one or more connecting flanges, wherein the frame body defines a frame opening, and each of the one or more connecting flanges extends from the frame body away from the frame opening, the one or more connecting flanges having a flange coupling surface that has at least a first flange coupling surface portion and a second flange coupling surface portion; and
a door hingedly coupled to a portion of the frame body, wherein the first and second flange coupling surface portions each define a plane, and the plane of the first flange coupling surface portion is transverse to the plane of the second flange coupling surface portion; and
a kennel comprising:
a hollow body, having an inner surface and an outer surface, the hollow body defining a kennel opening extending from the outer surface to the inner surface, and
at least one protrusion extending from the outer surface of the hollow body adjacent the kennel opening, wherein each of the at least one protrusion has at least one flange coupling surface that has at least two protrusion portions,
wherein at least the first and second flange coupling surface portions are couplable to the at least two protrusion portions such that each of the first and second flange coupling surface portions abuts the at least two protrusion portions.

2. The system of claim 1, wherein the door frame is symmetrical about at least one axis.

3. The system of claim 1, wherein the door is hingedly coupled to the portion of the frame body by a piano hinge.

4. The system of claim 3, wherein the piano hinge includes a removable pin.

5. The system of claim 1, wherein the plane of the first flange coupling surface portion and the plane of the second flange coupling surface portion define an angle with respect to the each other, wherein the angle is between 0 and 180 degrees.

6. The system of claim 1, wherein a shape of the kennel opening is square.

7. The system of claim 1, wherein the hollow body is made of rotomolded plastic.

8. The system of claim 7, wherein the hollow body is made of a single layer of rotomolded plastic.

9. The system of claim 1, wherein the kennel further comprises at least one handle coupled to the outer surface of the hollow body.

* * * * *